United States Patent [19]

Anderson

[11] Patent Number: 4,573,350
[45] Date of Patent: Mar. 4, 1986

[54] TEST SYSTEM FOR ELECTROMAGNETIC TRAILER BRAKE SYSTEM

[75] Inventor: Warren Anderson, Sturgis, Mich.

[73] Assignee: Grumman Aerospace Corporation, Bethpage, N.Y.

[21] Appl. No.: 685,765

[22] Filed: Dec. 24, 1984

[51] Int. Cl.[4] .............................................. G01L 5/28
[52] U.S. Cl. ..................... 73/129; 188/1.11; 340/52 B
[58] Field of Search ............... 73/121, 129; 340/52 A, 340/52 B, 52 R, 687; 303/24 BB, 24 F, 20; 188/1.11

[56] References Cited

U.S. PATENT DOCUMENTS

| | | | |
|---|---|---|---|
| 3,423,135 | 1/1969 | Beltramo | 303/7 |
| 3,840,276 | 10/1974 | Jubenville | 303/20 |
| 4,066,996 | 1/1978 | Davis | 340/52 R |
| 4,122,434 | 10/1978 | Jensen | 303/20 |

Primary Examiner—Jerry W. Myracle
Assistant Examiner—Robert R. Raevis
Attorney, Agent, or Firm—Richard G. Geib; Daniel J. Tick; Bernard S. Hoffman

[57] ABSTRACT

A test system for an electromagnetic brake system for a trailer, which includes a battery disposed in the towing vehicle for powering a plurality of brake electromagnets disposed in the trailer, an automatic controller for regulating current flow, resistors for both proportioning and balancing current flow among the plurality of brake electromagnets and between the towing vehicle and the trailer, respectively, the proportioning resistor is dropped from the system by a solenoid when the towing vehicle is put into reverse for testing, a gauge having both green and red zones is inserted into the system by a relay switch when the towing vehicle is put into reverse for testing, and a pushbutton for actuating the gauge is provided.

15 Claims, 2 Drawing Figures

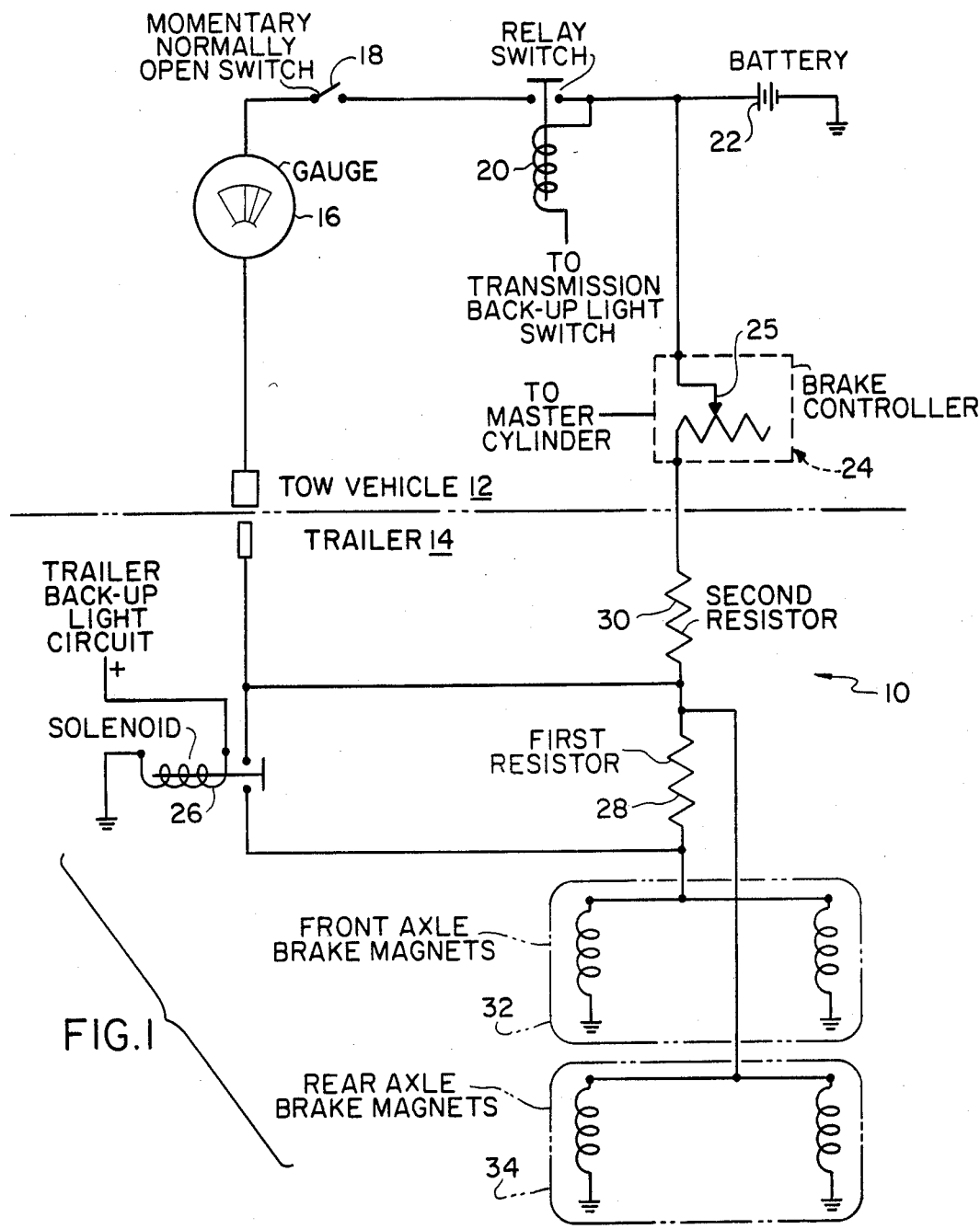
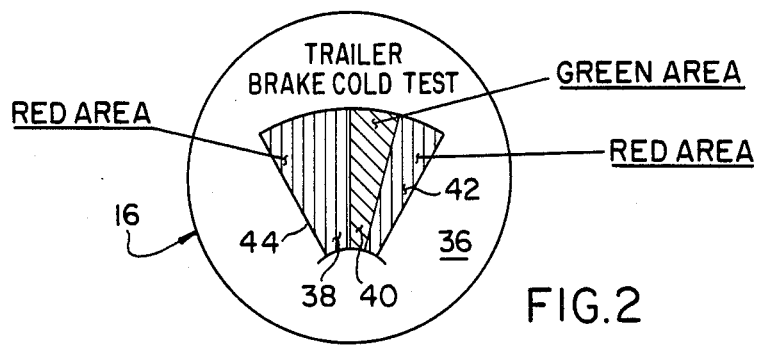
FIG.1
FIG.2

TEST SYSTEM FOR ELECTROMAGNETIC TRAILER BRAKE SYSTEM

BACKGROUND OF THE INVENTION

The present invention relates to a test system for an electromagnetic trailer brake system. More particularly, the present invention relates to a test system that can indicate the condition of an electromagnetic trailer brake system.

Test systems for electromagnetic trailer brake systems of the above-mentioned general type are known in the art.

U.S. patent application Ser. No. 658,459 to Myers, filed Feb. 17, 1976 and as disclosed in U.S. Pat. No. 4,066,996 to Davis, relates to breakaway protection for electrically controlled trailer brakes.

Myers teaches a voltage indicator with which the driver may test the auxiliary trailer battery to determine not only whether the battery has sufficient voltage to initially energize the brake coils but also whether the battery has adequate storage capacity to hold such voltage and keep the coils safely energized for a sustained period during breakaway. If the auxiliary trailer battery is good, the voltage indicator provides the driver with a visual signal informing him or her that it if safe to tow the trailer. Unfortunately, inherent in this design, the voltage indicator can also provide a safe signal by reason of, for example, an interruption of the excitation circuit to the brake coils or the loss of one or more of the coils from the circuit.

U.S. Pat. No. 4,066,996 to Davis teaches an improvement over the patent application of Myers, described supra, and assigned to the same assignee.

The teachings of Davis prevents the voltage indicator from producing a safe test signal unless all of the brake coils are properly connected in the excitation circuit and are all capable of receiving excitation current from the auxiliary trailer battery. Furthermore, the teachings of Davis detects whether all of the brake coils are capable of receiving excitation current by sensing the magnitude of the current in the excitation circuit and by disabling the voltage indicator unless the magnitude of the current through the circuit is sufficiently high to establish that all of the coils are in fact drawing current. This determination is achieved by comparing the current through the circuit to a predetermined threshold value.

However, the voltage indicators of both Myers and Davis test the output of the auxiliary trailer battery utilized only during breakaway and do not test the output of the towing vehicle battery utilized during normal towing for energizing the electromagnetic trailer brakes.

U.S. Pat. No. 3,840,276 to Jubenville relates to a control circuit for automatically monitoring and checking out a trailer brake system.

Jubenville teaches a safety or warning light which indicates if a supplementary portion of a vehicle braking system is inoperative. Furthermore, Jubenville teaches an electrical trailer braking system adapted to control oscillations or swaying of the trailer relative to the towing vehicle. Jubenville's warning light monitors only the oscillation controlling portion of the braking system and does not indicate whether the basic trailer braking system is operative, nor does Jubenville provide means for selectively testing the operability of portions of the basic trailer braking system.

U.S. Pat. No. 4,122,434 to Jensen relates to a test system for trailer brake mechanism and teaches an improvement over the aforementioned patent to Jubenville.

Jensen teaches an electrical testing circuit that indicates to the towing vehicle operator that the towed vehicle braking system is electrically operative. Furthermore, the electrical testing circuit selectively tests certain portions of the electrical braking system to more readily locate malfunctioning components. However, Jensen's warning or monitoring lamp monitors only the electrical conductivity of various portions of the electrical braking system and does not indicate if the electrically conductive braking system contains sufficient current to successfully stop the trailer.

SUMMARY OF THE INVENTION

Accordingly, it is a primary object of the present invention to provide a test system, for an electromagnetic trailer brake system that avoids the disadvantages of the prior art.

More particularly, it is an object of the present invention to provide a test system for an electromagnetic trailer brake system, which is intended to advise of possible problems with the trailer's brake.

In keeping with these objects, and with others which will become apparent hereinafter, one feature of the present invention resides, briefly stated, in a test system for an electromagnetic trailer brake system for a trailer, which includes a power source, a plurality of brake electromagnets connected to the power source, means for regulating current flow from the power source to the plurality of brake electromagnets, means for proportioning current flow among the plurality of brake electromagnets to control the amount of braking effect, means for dropping the proportioning current flow means from the electromagnetic trailer brake system, means for actuating the dropping means, means for monitoring the actual amount of current flow to the plurality of brake electromagnets wherein means for actuating said monitoring means is provided.

When the test system for an electromagnetic trailer brake system is designed in accordance with the present invention, the monitoring means is inserted into the electromagnetic trailer brake system and the proportioning current flow means is dropped from the electromagnetic trailer brake system when the means for actuating the dropping means is actuated so that when the means for actuating the monitoring means is actuated the monitoring means registers the current flow in the electromagnetic trailer brake system which is dependent upon only the condition of the plurality of brake electromagnets since the proportioning current flow means have been dropped from the electromagnetic trailer brake system and therefore the ability for the plurality of brake electromagnets to successfully stop the trailer when under tow can be determined.

In accordance with another feature of the present invention, the power source is the towing vehicle battery.

Still another feature of the present invention is that the plurality of brake electromagnets are disposed in the trailer.

A further feature of the present invention is that at least one brake electromagnet of the plurality of brake electromagnets is associated with a respective wheel of the trailer.

Another feature of the present invention is that the regulating current flow means is disposed in the towing vehicle.

Yet another feature of the present invention is that the current flow regulating means include an automatic controller.

Yet still another feature of the present invention is that the proportioning current flow means include a first resistor which proportions the braking effect of the front axle brake electromagnets of the trailer to that of the rear axle brake electromagnet of the trailer.

Still another feature of the present invention is that the dropping means include a solenoid and a relay switch.

Another feature of the present invention is that the means for actuating the dropping means include putting the towing vehicle into reverse.

Still yet another feature of the present invention is that the monitoring means include a gauge.

Yet another feature of the present invention is that the means for actuating the monitoring means include a momentary normally open pushbutton switch.

Yet still another feature of the present invention is that it further includes a second resistor which balances the total braking effect of the trailer with that of the towing vehicle.

Still another feature of the present invention is that the first resistor is 2.8 ohms.

Another feature of the present invention is that the second resistor is 2.2 ohms.

Still yet another feature of the present invention is that the monitoring means monitors current flow readings by utilizing both green and red zones.

Yet another feature of the present invention is that the monitoring means and the means for actuating the monitoring means are both disposed in the towing vehicle.

Another feature of the present invention is that the first resistor and the second resistor are both disposed in the trailer.

Still yet another feature of the present invention is that the dropping means are disposed in both the trailer and the towing vehicle.

Another feature of the present invention is that the relay switch is disposed in the towing vehicle and the solenoid is disposed in the trailer.

Finally, still a further feature of the present invention is that the automatic controller is hydraulically connected to the towing vehicle master cylinder so that the automatic controller can be actuated by depressing the towing vehicle brake pedal.

The novel features which are considered characteristic for the invention are set forth in particular in the appended claims. The invention itself, however, both as to its construction and its method of operation, together with additional objects and advantages thereof, will be best understood from the following description of the specific embodiment when read in connection with the accompanying drawing.

BRIEF DESCRIPTION OF THE DRAWING

FIG. 1 is a schematic of the test system for an electromagnetic trailer brake system in accordance with the present invention; and FIG. 2 depicts the face of the gauge utilized in the present invention of FIG. 1.

DETAILED DESCRIPTION OF THE PREFERRED EMBODIMENT

Referring now to FIG. 1, the test system for an electromagnetic trailer brake system is shown generally at 10 and includes a towing vehicle portion 12 and a trailer portion 14.

The towing vehicle portion 12 includes a gauge 16, a momentary normally open switch 18 (which could be of the pushbutton type), a relay switch 20, a towing vehicle battery 22, and a brake controller 24 having an actuating lever 25. The brake controller 24 is also hydraulically connected to the towing vehicle master cylinder and therefore can also be actuated by depressing the towing vehicle brake pedal.

The trailer portion 14 includes a solenoid 26, a first resistor 28, a second resistor 30, a plurality of front axle brake electromagents 32, and a plurality of rear axle brake electromagnets 34.

During normal operation of the electromagnetic trailer brake system, the brake controller 24 is connected to the towing vehicle battery 22 and is actuated when the pressure of the actuating lever 25 of the brake controller 24 is increased or the towing vehicle brake pedal is depressed. When the brake controller 24 is actuated, the current flows towards the plurality of front axle brake electromagnets 32 of the trailer and the plurality of real axle brake electromagnets 34 of the trailer.

However, prior to entering and energizing the plurality of front axle brake electromagnets 32 and the plurality of rear axle brake electromagnets 34, the current passes through the first resistor 28 and the second resistor 30. The first resistor 28 proportions the braking effect of the front axle brake electromagnets 32 of the trailer with that of the rear axle brake electromagnets 34 of the trailer so that the front axle brake electromagnets 32 exert less braking force than the rear axle brake electromagnets 34. The second resistor 30 balances the total braking effect of the trailer with that of the towing vehicle.

During testing operation of the electromagnetic trailer brake system, the parking brake of the towing vehicle is engaged, the engine of the towing vehicle is started, the brake controller 24 is not actuated (neither by depressing the towing vehicle brake pedal nor by moving the actuating lever 25), and the transmission selector of the towing vehicle is moved into reverse. When the towing vehicle is placed in reverse, both the towing vehicle transmission back-up light switch and the trailer back-up light circuit become operative and energize the relay switch 20 and the solenoid 26, respectively.

The energized solenoid 26 causes the first resistor 28 to be bypassed. Since the relay switch 20 is closed, current flows to the gauge 16 when the momentary normally open switch 18 is closed.

Since the brake controller 24 is not actuated, neither by depressing the towing vehicle brake pedal nor by moving the actuating lever 25, the second resistor 30 is removed. Since the first resistor 28 is bypassed and the second resister 30 is removed, the gauge 16 registers only the current flow in the front axle brake electromagnets 32 of the trailer and in the rear axle brake electromagnets 34 of the trailer when the momentary normally open switch 18 is closed. The gauge 16 would then indicate the condition of the front axle brake electromagnets 32 of the trailer and of the rear axle brake electromagnets 34 of the trailer and it would be determined if the front axle brake electromagnets 32 and the rear axle brake electromagnets 34 could successfully stop the trailer under tow.

The gauge 16, as shown in FIG. 2, has a face 36 with three indicating zones 38, 40 and 42 and a needle 44. If when the momentary normally open switch 18 is closed and the needle 44 moves to the zone 40 which is green, then maximum braking capacity in the front axle brake electromagnets 32 of the trailer and in the rear axle brake electromagnets 34 of the trailer is available. However, if when the momentary normally open switch 18 is closed and the needle 44 moves to either of the zones 38 or 42 which are red, then maximum braking capacity in the front axle brake electromagnets 32 of the trailer and/or in the rear axle brake electromagnets 34 of the trailer is not available.

The gauge 16 indicates braking capacity in the front axle brake electromagnets 32 of the trailer and in the rear axle brake electromagnets 34 of the trailer. This is accomplished because the gauge 16 registers the current in the front axle brake electromagnets 32 and in the rear axle brake electromagnets 34, and the field strength of the front axle brake electromagnets 32 and the rear axle brake electromagnets 34 is directly proportional to and a function of the current.

It will be understood that each of the elements described above, or two or more together, may also find a useful application in other types of constructions differing from the types described above.

While the invention has been illustrated and described as embodied in a test system for an electromagnetic trailer brake system it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristcs of the generic or specific aspects of this invention.

What is claimed as new and desired to be protected by Letters Patent is set forth in the appended claims.

I claim:

1. A test system for an electromagnetic trailer brake system, comprising:
    a power source;
    a plurality of brake electromagnets connected to said power source;
    means for regulating current flow from said power source to said plurality of brake electromagnets;
    means for proportioning current flow among said plurality of brake electromagnets to control the braking effect;
    means for dropping said proportioning current flow means from the electromagnetic trailer brake system;
    means for actuating said dropping means;
    means for monitoring the actual amount of current flow to said plurality of brake electromagnets; and
    means for actuating said monitoring means, said monitoring means being inserted into the electromagnetic trailer brake system and said proportioning current flow means being dropped from the electromagnetic trailer brake system when said means for actuating said dropping means is actuated so that when said means for actuating said monitoring means is actuated said monitoring means registers the current flow in the electromagnetic trailer brake system which is dependent upon only the condition of said plurality of brake electromagnets since said proportioning current flow means have been dropped from the electromagnetic trailer brake system and therefore the ability for said plurality of electromagnets to successfully stop the trailer when under tow can be determined.

2. A test system as defined in claim 1, wherein said power source is the towing vehicle battery.

3. A test system as defined in claim 1, wherein said plurality of brake electromagnets are disposed in the trailer.

4. A test system as defined in claim 1, wherein said regulating current flow means is disposed in the towing vehicle.

5. A test system as defined in claim 1, wherein said current flow regulating means include an automatic controller.

6. a test system as defined in claim 1, wherein said proportioning current flow means include a first resistor which proportions the braking effect of the front axle brake electromagnets of the trailer to that of the rear axle brake electromagnets of the trailer.

7. A test system as defined in claim 1, wherein said dropping means include a relay switch and a solenoid.

8. A test system as defined in claim 1, wherein said monitoring means include a gauge.

9. A test system as defined in claim 1, wherein said means for actuating said monitoring means include a momentary normally open pushbutton switch.

10. A test system as defined in claim 6; further comprising a second resistor which balances the total braking effort of the trailer with that of the towing vehicle.

11. A test system as defined in claim 1, wherein said monitoring means and said means for actuating said monitoring means are both disposed in the towing vehicle.

12. A test system as defined in claim 10, wherein said first resistor and said second resistor are both disposed in the trailer.

13. A test system as defined in claim 1, wherein said dropping means is disposed in both the trailer and the towing vehicle.

14. A test system as defined in claim 7, wherein said relay switch is disposed in the towing vehicle and said solenoid is disposed in the trailer.

15. A test system as defined in claim 5, wherein said automatic controller is hydraulically connected to the towing vehicle master cylinder so that said automatic controller can be actuated by depressing the towing vehicle brake pedal.

* * * * *

UNITED STATES PATENT AND TRADEMARK OFFICE
CERTIFICATE OF CORRECTION

PATENT NO. : 4,573,350
DATED : March 4, 1986
INVENTOR(S) : WARREN ANDERSON

It is certified that error appears in the above-identified patent and that said Letters Patent are hereby corrected as shown below:

Title sheet, line [73], change "Grumman Aerospace Corporation" to
--Grumman Allied Industries, Inc.--.

Signed and Sealed this

Twenty-sixth Day of August 1986

[SEAL]

Attest:

Attesting Officer

DONALD J. QUIGG

Commissioner of Patents and Trademarks